United States Patent
Reyes

(10) Patent No.: US 8,727,002 B2
(45) Date of Patent: May 20, 2014

(54) ACIDIC TREATMENT FLUIDS CONTAINING NON-POLYMERIC SILICA SCALE CONTROL ADDITIVES AND METHODS RELATED THERETO

(75) Inventor: Enrique Antonio Reyes, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 394 days.

(21) Appl. No.: 12/967,868

(22) Filed: Dec. 14, 2010

(65) Prior Publication Data

US 2012/0145401 A1  Jun. 14, 2012

(51) Int. Cl.
E21B 43/25 (2006.01)
E21B 37/00 (2006.01)

(52) U.S. Cl.
USPC .................................. 166/305.1; 166/312

(58) Field of Classification Search
None
See application file for complete search history.

(56) References Cited

U.S. PATENT DOCUMENTS

| | | | | |
|---|---|---|---|---|
| 1,873,083 A * | 8/1932 | Walker | | 507/206 |
| 2,650,194 A * | 8/1953 | Rahn | | 507/106 |
| 2,221,815 A | 11/1970 | Rice | | |
| 3,889,753 A * | 6/1975 | Richardson | | 166/307 |
| 4,079,006 A * | 3/1978 | Mitchell | | 210/700 |
| 4,189,383 A * | 2/1980 | Miles et al. | | 210/698 |
| 4,192,744 A * | 3/1980 | Clark et al. | | 210/735 |
| 4,479,543 A * | 10/1984 | Kalfayan et al. | | 166/300 |
| 4,708,207 A * | 11/1987 | Kalfayan et al. | | 166/295 |
| 5,277,823 A | 1/1994 | Hann et al. | | |
| 5,294,371 A * | 3/1994 | Clubley et al. | | 252/389.23 |
| 5,529,125 A * | 6/1996 | Di Lullo Arias et al. | | 166/307 |
| 5,558,171 A | 9/1996 | McGlothlin et al. | | |
| 5,665,242 A | 9/1997 | Gallup | | |
| 5,858,245 A * | 1/1999 | Gallup | | 210/698 |
| 6,070,664 A | 6/2000 | Dalrymple et al. | | |
| 6,153,106 A | 11/2000 | Kelley et al. | | |
| 6,461,518 B1 | 10/2002 | Demadis et al. | | |
| 6,476,169 B1 | 11/2002 | Eoff et al. | | |
| 6,506,711 B1 * | 1/2003 | Shuchart et al. | | 507/267 |
| 6,531,427 B1 | 3/2003 | Shuchart et al. | | |
| 6,547,871 B2 | 4/2003 | Chatterji et al. | | |

(Continued)

FOREIGN PATENT DOCUMENTS

FR  2858314 A1  2/2005
GB  1 247 213  9/1971

(Continued)

OTHER PUBLICATIONS

Okoye et al, "Characterization of Formation Damage in Heavy Oil Formation During Steam Injection," SPE 19417, 1990.

(Continued)

Primary Examiner — Angela M DiTrani
Assistant Examiner — Anuradha Ahuja
(74) Attorney, Agent, or Firm — McDermott Will & Emery LLP; Holly Soehnge

(57) ABSTRACT

Treatment fluids may be used to retard the deposition of silica scale in subterranean formations. Methods for treating a subterranean formation can comprise providing a treatment fluid having a pH of 6 or less that comprises an acidic base fluid and a non-polymeric silica scale control additive, and introducing the treatment fluid into at least a portion of a subterranean formation. The non-polymeric silica scale control additive retards deposition of silica scale in the subterranean formation.

20 Claims, 1 Drawing Sheet

(56) References Cited

U.S. PATENT DOCUMENTS

| | | | |
|---|---|---|---|
| 6,877,563 | B2 | 4/2005 | Todd et al. |
| 7,021,383 | B2 | 4/2006 | Todd et al. |
| 7,091,159 | B2 | 8/2006 | Eoff et al. |
| 7,114,568 | B2 | 10/2006 | Eoff et al. |
| 7,159,656 | B2 | 1/2007 | Eoff et al. |
| 7,159,659 | B2 | 1/2007 | Welton et al. |
| 7,192,908 | B2* | 3/2007 | Frenier et al. ........... 507/241 |
| 7,207,387 | B2 | 4/2007 | Eoff et al. |
| 7,216,707 | B2 | 5/2007 | Eoff et al. |
| 7,220,708 | B2 | 5/2007 | Zamora et al. |
| 7,273,099 | B2 | 9/2007 | East, Jr. et al. |
| 7,316,787 | B2 | 1/2008 | Hendel et al. |
| 7,398,825 | B2 | 7/2008 | Nguyen et al. |
| 7,552,771 | B2 | 6/2009 | Eoff et al. |
| 7,563,750 | B2 | 7/2009 | Eoff et al. |
| 7,589,048 | B2 | 9/2009 | Eoff et al. |
| 7,589,050 | B2* | 9/2009 | Frenier et al. ........... 507/241 |
| 7,595,283 | B2 | 9/2009 | Eoff et al. |
| 7,741,251 | B2 | 6/2010 | Eoff et al. |
| 7,759,292 | B2 | 7/2010 | Eoff et al. |
| 2004/0229756 | A1 | 11/2004 | Eoff et al. |
| 2004/0254079 | A1* | 12/2004 | Frenier et al. ........... 507/260 |
| 2005/0016731 | A1* | 1/2005 | Rae et al. ............... 166/307 |
| 2005/0150838 | A1 | 7/2005 | Duke et al. |
| 2005/0155796 | A1 | 7/2005 | Eoff et al. |
| 2005/0194140 | A1 | 9/2005 | Dalrymple et al. |
| 2005/0199396 | A1 | 9/2005 | Sierra et al. |
| 2006/0137875 | A1 | 6/2006 | Dusterhoft et al. |
| 2006/0180309 | A1 | 8/2006 | Welton et al. |
| 2006/0180310 | A1 | 8/2006 | Welton et al. |
| 2006/0183646 | A1 | 8/2006 | Welton et al. |
| 2006/0266522 | A1 | 11/2006 | Eoff et al. |
| 2006/0283592 | A1 | 12/2006 | Sierra et al. |
| 2008/0011687 | A1 | 1/2008 | Campo et al. |
| 2008/0110812 | A1 | 5/2008 | Jensen et al. |
| 2008/0132711 | A1 | 6/2008 | Poelker et al. |
| 2009/0042748 | A1* | 2/2009 | Fuller ................... 507/203 |
| 2009/0111718 | A1 | 4/2009 | Gadiyar et al. |
| 2009/0192057 | A1* | 7/2009 | Frenier et al. ........... 507/235 |
| 2009/0233819 | A1* | 9/2009 | Fuller et al. ............. 507/224 |
| 2009/0271501 | A1 | 10/2009 | Shenfield et al. |
| 2009/0291863 | A1 | 11/2009 | Welton et al. |
| 2009/0312201 | A1 | 12/2009 | Huang et al. |
| 2010/0021552 | A1 | 1/2010 | Hayes et al. |
| 2011/0079392 | A1 | 4/2011 | Reyes |

FOREIGN PATENT DOCUMENTS

| | | |
|---|---|---|
| WO | WO0051945 | 9/2000 |
| WO | WO2007051167 A3 | 5/2007 |
| WO | WO2009085377 A1 | 7/2009 |

OTHER PUBLICATIONS

Shuchart et al., "Improved Success in Acid Stimulations with a New Organic—HF System," SPE 36907, 1996.
Gdanski et al., "Advanced Sandstone Acidizing Designs Using Improved Radial Models," SPE 38597, 1997.
Stanely et al., "Matrix Acidizing Horizontal Gravel-Packed Wells for Fines Damage Removal," SPE 65519, 2000.
Wennberg et al., "Successful Mud Acid Stimulations Maintain Productivity in Gravelpacked Wells at Heidrun," SPE 68925, 2001.
Husen et al., "Chelating Agent-Based Fluids for Optimal Stimulation of High-Temperature Wells," SPE 77366, 2002.
Ali et al., "Stimulation of High-Temperature Sandstone Formations from West Africa with Chelating Agent-Based Fluids," SPE 93805, 2008.
Ali et al., "Effective Stimulation of High-Temperature Sandstone Formations in East Venezuela with a New Sandstone-Acidizing System," SPE 98318, 2006.
Xiao et al., "Reactive Transport Modeling of Carbonate and Siliciclastic Diagenesis and Reservoir Quality Prediction," SPE 101669, 2006.
Aboud et al., "Effective Matrix Acidizing in High-Temperature Environments," SPE 109818, 2007.
Falcone et al., "Oil and Gas Expertise for Geothermal Exploitation: The Need for Technology Transfer," SPE 113852, 2008.
Kerkar et al., "Assessment of Dynamic Filtration Formation Damage for Alaskan North Slope Drilling Fluids," SPE 114142, 2008.
Huang et al., "Using Nanoparticle Technology to Control Formation Fines Migration," SPE 115384, 2008.
Pedenaud et al., "A New Water Treatment Scheme for Thermal Development: The SIBE Process," SPE/PS/CHOA 117561, PS 2008-304, 2008.
Gomez et al., "Acid Stimulation of Geothermal Wells in Central America," SPE 121300, 2008.
Weaver et al., "A Study of Proppant-Formation Reactions," SPE 121465, 2009.
Neofotistou et al., "Silica Scale Inhibition by Polyaminoamide STARBURST® Dendrimers," Colloids and Surfaces A: Physicochem. Eng. Aspects 242 (2004) 213-216.
Mavredaki et al., "Inhibition and Dissolution as Dual Mitigation Approaches for Colloidal Silica Fouling and Deposition in Process Water Systems: Functional Synergies," Ind. Eng. Chem. Res. (2005), 44, 7019-7026.
Demadis et al., "Solubility Enhancement of Silicate with Polyamine/ Polyammonium Cationic Macromolecules: Relevance to Silica-Laden Process Waters," Ind. Eng. Chem. Res. (2006), 45, 4436-4440.
Demadis et al., "Industrial Water Systems: Problems, Challenges and Solutions for the Process Industries," Desalination(2007), 213, 38-46.
Demadis, et al., "Inhibitory Effects of Multicomponent, Phosphonate-Grafted, Zwitterionic Chitosan Biomacromolecules on Silicic Acid Condensation," Biomacromolecules (2008), 9, 3288-3293.
Stathoulopoulou et al., "Enhancement of Silicate Solubility by Use of 'Green' Additives: Linking Green Chemistry and Chemical Water Treatment," Desalination (2008), 224, 223-230.
Ketsetzi et al., "Being 'Green' in Chemical Water Treatment Technologies: Issues, Challenges and Developments," Desalination (2008), 223, 487-493.
Euvrard et al., "Influence of PPCA (Phosphinopolycarboxylic Acid) and DETPMP (Diethylenetriaminepentamethylenephosphonic Acid) on Silica Fouling," Desalination 205 (2007) 114-123.
Esumi et al., "Adsorption of Poly(Amidoamine) Dendrimers on Alumina/Water and Silica/Water Interfaces," Langmuir (1998), 14, 4466-4470.
Laird et al., "Elemental Recoveries for Clay Minerals Analysed by Inductively Coupled Plasma Atomic Emission Spectrometry Using Slurry Nebulisation," Journal of Analytical Atomic Spectrometry, vol. 5, (Sep. 1990).
Hamrouni et al., "Analytical Aspects of Silica in Saline Waters—Application to Desalination of Brackish Waters," Desalination 136 (2001) 225-232.
Strekopytov et al., "The Formation, Precipitation and Structural Characterisation of Hydroxyaluminosilicates Formed in the Presence of Fluoride and Phosphate," Polyhedron 24 (2005) 1585-1592.
Azaroual et al., "Solubility of Silica Polymorphs in Eletrolyte Solutions, I. Activity Coefficient of Aqueous Silica from 25° to 250° C, Pitzer's Parameterisation," Chemical Geology 140, (1997), 155-165.
Zhou et al., "Effect of Sodium Chloride on Gelatinization of Silicic Acid and the Formation of Novel Polysilicic Acid Crystals," Journal of Non-Crystalline Solids, 353 (2007), 2774-2778.
Nour et al., "Spectroscopic Evidence of Silica-Lignin Complexes: Implications for Treatment of Non-Wood Pulp Wastewater," Water Science and Technology, vol. 50, No. 3, pp. 157-166, 2004.
Chen et al., "Influence of Catechin on Precipitation of Aluminum Hydroxide," ScienceDirect Geoderma 152 (2009), 296-300.
Ohman et al., "Equilibrium and Structural Studies of Silicon (IV) and Aluminum (III) in Aqueous Solution. 28. Formation of Soluble Silicic Acid-Ligand Complexes as Studied by Potentiometric and Solubility Measurements," Department of Inorganic Chemistry, University of Umea, S-901 87, pp. 335-341, 1990.

(56) References Cited

OTHER PUBLICATIONS

Pokrovski et al., "Experimental Study of the Complexation of Silicon and Germanium with Aqueous Organic Species: Implications for Germanium and Silicon Transport and Ge/Si Ratio in Natural Waters," Geochimica et Cosmochimica Acta, vol. 62, No. 21/22, pp. 3413-3428, 1998.

Dhar et al., "Six-Coordinate Silicon (IV). The Hydrolysis and Racemization of the Tris-(Acetylacetonato)-Silicon (IV) Cation," Department of Chemistry, Wayne State University, vol. 81, 1959.

Gorrepati et al., "Silica Precipitation in Acidic Solutions: Mechanism, pH Effect, and Salt Effect," Langmuir, American Chemical Society, 2010.

Sedeh et al., "Equilibrium and Structural Studies of Silicon (IV) and Aluminum (III) in Aqueous Solution. 30. Aqueous Complexation Between Silicic Acid and Some Ortho-Di and Triphenolic Compounds," Department of Inorganic Chemistry, University of Umea, S-901 87, pp. 933-940, 1992.

Gorrepati, "Silica Precipitation from Analcime Dissolution," A Dissertation Submitted in Partial Fulfillment of the Requirements for the Degree of Doctor of Philosophy (Chemical Engineering) in the University of Michigan, 2009.

Bai et al., "Polymer Degradation and Stability," Depolymerisation of Polysilicic Acid by Tiron, vol. 94, No. 10, Jun. 17, 2009, pp. 1795-1799, XP002671747.

Bartels et al., "Bildung and Struktur von Silizium-Komplexen," Helv. Chim. Act., vol. 47, No. 1, Dec. 12, 1964, pp. 7-13, XP002671748.

Evans et al., Nuclear Magnetic Resonance Studies of Silicon(IV) Complexes in Aqueous Solution—I. Tris-Catecholato Complexes, Polyhedron, vol. 9, Oct. 18, 1989, pp. 813-823, XP002671750.

International Search Report and Written Opinion for PCT/GB2011/001715 dated Jun. 27, 2012.

Rosentheim et al., "Uber Innerkimplexe Brenzcatechinate vierwertiger Elemente," (English Abstract—On Intra-Complex Brenzcatechinate Tetravalent Elements), vol. 196, pp. 160-176, 1931.

Kalfayan, Leonard, "Production Enhancement with Acid Stimulation," 2nd Ed., PennWell Corporation, 2008.

Cho, et al., "Solution State Structure Determination of Silicate Oligomers by 29Si NMR Spectroscopy and Molecular Modeling," J. Am. Chem. Soc., 128:2006, pp. 2324-2335.

Lambert, et al., "Silicate Complexes of Sugars in Aqueous Solution," J. Am. Chem. Soc., 126:2004, pp. 9611-9625.

Sahai, et al, "29Si NMR Shifts and Relative Stabilities Calculated for Hypercoordinated Silicon?Polyalcohol Complexes: Role in Sol?Gel and Biogenic Silica Synthesis," Inorg. Chem., 41:2002, pp. 748-756.

Sanchez, et al., "29Si NMR Kinetic Study of Tetraethoxysiland and Ethyl-Substituted Ethoxysilane Polymerization in Acidic Conditions," Ind. Eng. Chem. Res., 35:1996, pp. 117-129.

Kalfayan, "Production Enhancement with Acid Stimulation," PennWell Corp., 2000.

* cited by examiner

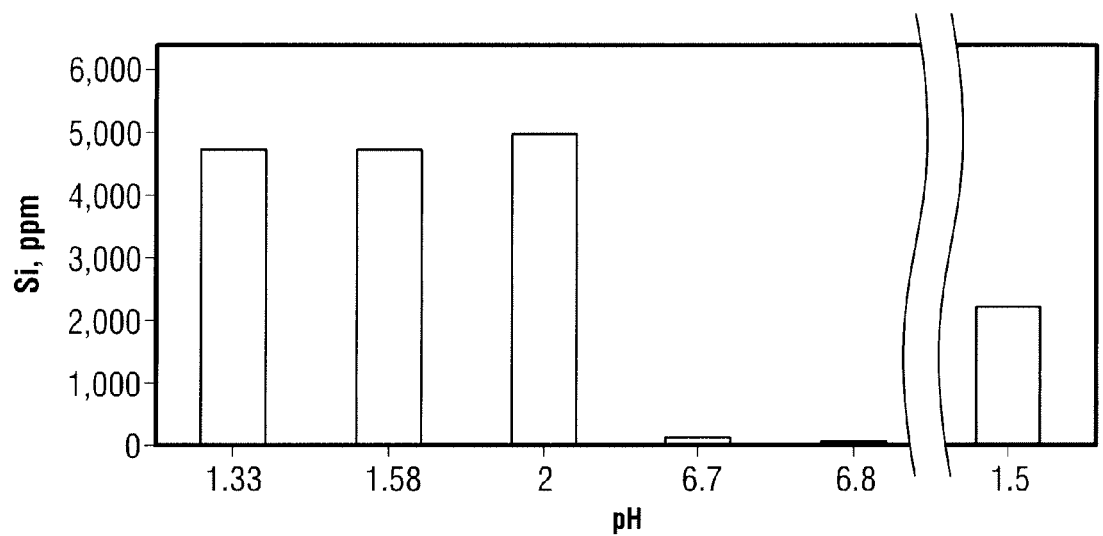

ACIDIC TREATMENT FLUIDS CONTAINING NON-POLYMERIC SILICA SCALE CONTROL ADDITIVES AND METHODS RELATED THERETO

BACKGROUND

The present invention relates to treatment fluids and compounds useful in subterranean formations, and, more particularly, to treatment fluids and compounds for retarding deposition of silica scale in subterranean formations. Treatment fluids can be used in a variety of subterranean operations, including, for example, stimulation treatments, conformance treatments, hydraulic fracturing treatments, acidizing treatments, remediation treatments, scale removal treatments, scale inhibition treatments, and the like. As used herein, the terms "treatment" and/or "treating" refer to any subterranean operation that uses a fluid in conjunction with achieving an intended function and/or an intended purpose. Use of these terms herein does not imply any particular action by the fluid or any particular component thereof. As used herein, the term "treatment fluid" refers to any fluid that can be used in a subterranean operation in conjunction with an intended function and/or an intended purpose.

Treatment fluids comprising an acidic base fluid can be used in a number of subterranean operations including, for example, stimulation operations and acidizing treatments. Treatment operations utilizing an acidic base fluid are especially challenging in some subterranean formations due to siliceous and aluminosilicate minerals commonly encountered therein. These silicon-containing minerals can interact with an acidic base fluid to produce dissolved silicon species, which can subsequently precipitate at higher pH values (e.g., greater than about 3) as amorphous, gelatinous and/or colloidal silica. As used herein, the terms "dissolved silicon" and/or "dissolved silica" will equivalently refer to silicic acid, silanols, and other soluble silicon species. As used herein, the term "silica scale" will refer to precipitated amorphous silica, precipitated gelatinous silica, precipitated colloidal silica, and hardened crusts of amorphous silica, gelatinous silica and/or colloidal silica.

Silicates (e.g., orthosilicates and metasilicates) are salts derived from silicic acid and other dissolved silicon species. As a class, silicates other than alkali metal silicates are sparingly soluble in water, particularly after polymerization to form polysilicates. Under mildly acidic to alkaline conditions, silicic acid monomers and other dissolved silicon species ordinarily condense into cyclic oligomers, which subsequently grow in size and eventually precipitate as colloidal, gelatinous and/or amorphous silica deposits (i.e., silica scale). A number of factors influence the saturation concentration of soluble silicon including, for example, pH, temperature, type(s) of dissolved silicon species present, ionic strength and the presence or absence of certain ionic moieties. For example, at pH values well below 1, dissolved silicon concentrations of 0.01 M or greater are attainable. However, at pH values of 3 or above, the saturation concentration becomes much lower. Certain metal ions, particularly $Al^{3+}$, are especially adept at lowering the saturation solubility of dissolved silicon species even further. At pH values of 3 or above, $Al^{3+}$ and soluble silicon species react to form insoluble aluminosilicate materials, thereby exacerbating an already challenging precipitation problem.

Various conditions can lead to the deposition and subsequent transformation of precipitated silica deposits into a hard crust of silica scale. For example, simple drying can transform precipitated silica deposits into a hard crust of silica scale. Silica scale buildup can form on any downhole surface such as, for example, tool surfaces and wellbore surfaces, which can detrimentally impact further subterranean operations. In addition, precipitated silica scale during an acidizing treatment can result in the plugging of pores in a subterranean formation, thereby decreasing porosity and detrimentally affecting yield.

Once formed, silica scale buildup can be difficult to remove. Silica scale buildup is typically removed through treatment with a strong acid. Although the saturation concentration of soluble silica increases with increasing acid strength, extremely acidic solutions can be unsuitable for certain subterranean formations. For example, subterranean formations having high pressures, high temperatures, and/or excessive quantities of acid-soluble minerals (e.g., sandstone) may not be effectively treated by using strong acids without the risk of undesirable formation damage occurring in some instances. In addition, the introduction of additional acids into a treatment operation can increase its cost and complexity.

Moreover, when the subterranean formation contains clays, which typically contain $Al^{3+}$, the problem of silica scale removal can be exacerbated even further due to the aforementioned insolubility of aluminosilicate minerals. The removal of aluminosilicates also typically requires treatment with a strong acid, which has the undesirable effects mentioned above.

An alternative strategy for dealing with the problem of silica scale deposition in a subterranean formation is to suppress the deposition of amorphous, gelatinous and/or colloidal silica that leads to silica scale buildup. One way for suppressing the deposition of silica scale is to add a silica scale control additive to a treatment fluid that slows or prevents the polymerization of soluble silica species into precipitated colloidal, gelatinous and/or amorphous silica. Illustrative silica scale control additives that have been used in the art include, for example, phosphonates, aminocarboxylic acids, and polyaminocarboxylic acids. These agents are most effectively used at circumneutral and sometimes higher pH values (e.g., pH>~5.5) due to the necessity of forming a deprotonated species for complexing the soluble silica. Certain polymeric species have also been used for inhibiting the deposition of silica scale. Illustrative polymeric silica scale control additives are disclosed in U.S. patent application Ser. No. 12/917,167, filed Nov. 1, 2010 and now available as U.S. Patent Application Publication 20110079392, which is incorporated herein by reference in its entirety.

In acidizing treatments not utilizing silica scale control measures, dissolved silicon is often left to precipitate as the pH gradually rises from acidic to circumneutral conditions. Conventional polymeric silica scale control additives are typically used in this circumneutral pH region to address the deposition of silica scale after oligomerization of dissolved silicon has already occurred. To this end, conventional silica scale control additives are typically infused continuously to a subterranean formation over a period of hours to weeks to inhibit the deposition of silica scale. However, conventional silica scale control additives fail to address the short term oligomerization processes that ultimately lead to silica scale buildup.

SUMMARY

The present invention relates to treatment fluids and compounds useful in subterranean formations, and, more particularly, to treatment fluids and compounds for retarding deposition of silica scale in subterranean formations.

In one embodiment, the present invention provides a method comprising: providing a treatment fluid having a pH of 6 or less that comprises an acidic base fluid and a non-polymeric silica scale control additive; and introducing the treatment fluid into at least a portion of a subterranean formation; wherein the non-polymeric silica scale control additive retards deposition of silica scale in the subterranean formation.

In one embodiment, the present invention provides a method comprising: providing a treatment fluid that comprises an acidic base fluid and a non-polymeric silica scale control additive; wherein the non-polymeric silica scale control additive comprises a tannin; and introducing the treatment fluid into at least a portion of a subterranean formation; wherein the non-polymeric silica scale control additive retards deposition of silica scale in the subterranean formation.

In one embodiment, the present invention provides a method for retarding deposition of silica scale in a subterranean formation, the method comprising: placing a treatment fluid that comprises an acidic base fluid and a non-polymeric silica scale control additive in the subterranean formation; wherein the treatment fluid has a pH between about 0 and about 6; and wherein the non-polymeric silica scale control additive comprises tannic acid.

In one embodiment, the present invention provides a method comprising: providing a treatment fluid having a pH between about 0 and about 6 that comprises an acidic base fluid and a non-polymeric silica scale control additive; wherein the non-polymeric silica scale control additive comprises an ortho-dihydroxybenzene compound; and introducing the treatment fluid into at least a portion of a sandstone formation; wherein the non-polymeric silica scale control additive retards deposition of silica scale in the sandstone formation.

The features and advantages of the present invention will be readily apparent to those of ordinary skill in the art upon a reading of the description of the embodiments that follow.

BRIEF DESCRIPTION OF THE DRAWINGS

The following FIGURE is included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

FIG. 1 shows an illustrative bar graph of measured silicon concentration as a function of pH in the presence of tannic acid.

DETAILED DESCRIPTION

The present invention relates to treatment fluids and compounds useful in subterranean formations, and, more particularly, to treatment fluids and compounds for retarding deposition of silica scale in subterranean formations. In various embodiments, the present invention describes methods for retarding deposition of silica scale in subterranean formations. The foregoing is accomplished by addition of a silica scale control additive to the treatment fluids of the present invention.

There are many advantages of the present invention, only a few of which are discussed or alluded to herein. In general, the present invention describes methods for retarding the deposition of silica scale (e.g., precipitated amorphous, gelatinous and/or colloidal silica and/or hardened deposits thereof) in a subterranean formation by using non-polymeric silica scale control additives that are effective over a broad range of acidic to circumneutral pH values (e.g., a pH of about 0 to about 6). As used herein, the term "non-polymeric silica scale control additive" refers to any non-polymeric compound that is capable of retarding silica scale deposition in a subterranean formation by increasing the saturation solubility of dissolved silicon, inhibiting chain propagation of silicic acid oligomerization processes, and/or decreasing the particle size and/or quantity of any silica scale precipitates formed in a subterranean formation. In general, the present non-polymeric silica scale control additives can function by 1) retarding the deposition of silica scale before or after oligomerization of dissolved silicon, and/or 2) by limiting the particle size of precipitated silica such that the particles are effectively transported out of the well bore before having an opportunity to deposit therein. The foregoing functions of the present non-polymeric silica scale control additives should not be considered mechanistically limiting, and any means for suppressing the deposition of silica scale in a subterranean formation using the additives lies within the spirit and scope of the present invention. As used herein, the term "non-polymeric" refers to a compound that does not have more than about five consecutive repeating monomer units in its structure. In general, the non-polymeric silica scale control additives of the present invention have a molecular weight of less than about 3000.

Without wishing to be limited by mechanism or theory, it is believed that the non-polymeric silica scale control additives of the present invention retard deposition of silica scale by inhibiting the chain propagation steps of silicic acid oligomerization into insoluble silica precipitates. The present non-polymeric silica scale control additives can also retard nucleation and crystal growth processes of silica precipitates, thereby allowing small silica scale particulates to be transported out of the subterranean formation by a well bore, rather than having an opportunity to deposit therein and cause formation damage. Circulating silica particles that do not precipitate are tolerable in subterranean operations, allowing for continuous well bore operations to be performed.

One of ordinary skill in the art will recognize that the saturation solubility of dissolved silicon in an aqueous treatment fluid not containing a silica scale control additive is approximately 500 ppm or less at circumneutral to alkaline pH values (e.g., pH>~6.5). Having the benefit of this disclosure, one of ordinary skill in the art will understand that maintaining dissolved silicon concentrations above this level can be exceedingly beneficial for treatment operations in subterranean formations by limiting formation damage that can occur by silica scale deposition. In some embodiments, the non-polymeric silica scale control additives of the present invention beneficially improve the saturation solubility of dissolved silicon to about 0.01 M and higher over a pH range between about 0 and about 4 to about 6. Although the present non-polymeric silica scale control additives can certainly be used at even lower pH values while still residing within the spirit and scope of the present invention, pH values lower than about 0 represent an acidity region in which high concentrations of dissolved silicon already can be realized, even in the absence of a silica scale control additive. Hence, the present non-polymeric silica scale control additives are operable over a pH range in which high concentrations of dissolved silicon are not readily achievable at present.

Due to their operable pH range, the present non-polymeric silica scale control additives are suitable for use in acid-sensitive subterranean formations in which strong acid treatment fluids cannot be effectively used for inhibiting or removing silica scale deposition. For example, sandstone formations are particularly sensitive to acids and are often not amenable to acidizing treatments due to their propensity to deconsolidate and lose cementing material in the presence of strong acids. Further, sandstone formations are very prone toward formation of silica scale due to their chemical makeup. Particularly problematic are sandstone formations having temperatures in excess of ~220-250° F., which leads to increased acid reactivity and faster dissolution of the sandstone matrix. Utilizing the present non-polymeric silica scale control additives in sandstone formations, including hydrothermal sandstone formations, these formations can be effectively treated in stimulation and acidizing operations, for example. In sandstone formations and other types of subterranean formations, the present non-polymeric silica scale control additives advantageously offer a much wider pH window for conducting subterranean operations. Furthermore, the methods of the present invention complement the use of existing, strongly acidic acidizing fluids by maintaining high levels of dissolved silicon in a treatment fluid that are otherwise only attainable at much lower pH values.

Methods of the present invention utilize ortho-dihydroxybenzene compounds and derivatives thereof as non-polymeric silica scale control additives to achieve high concentrations of dissolved silicon in a treatment fluid. According to conventional wisdom, ortho-dihydroxybenzene compounds are capable of complexing dissolved silicon only at very weakly acidic to highly alkaline pH values (e.g., >~6.5 and preferentially >~9) due to a presumed requirement for deprotonating the ortho-phenolic hydroxy groups to form a species capable of complexing dissolved silicon. However, Applicant has surprisingly discovered that ortho-dihydroxybenzene compounds are capable of associating and/or complexing with silicon over a much lower pH range than that previously reported to achieve high concentrations of dissolved silicon. The ability to operate at acidic pH values is further beneficial due to the known propensity of ortho-dihydroxybenzene compounds to oxidize under alkaline conditions.

As used herein, the terms "complex," "complexed," "complexing" and "complexation" refer to a silicon coordination compound formed from dissolved silicon and an ortho-dihydroxybenzene compound. As used herein, the terms "associate," "associated," "associating" and "association" refer to any interaction between dissolved silicon and an ortho-dihydroxybenzene compound that is not a silicon coordination compound, particularly a hexacoordinate silicon coordination compound. In general, according to the present embodiments, complexation of dissolved silicon occurs at high pH values (i.e., >~6), whereas association of dissolved silicon occurs at lower pH values (i.e., pH<~6). Applicant has found that under acidic conditions, a reaction between dissolved silicon and an ortho-hydroxybenzene compound produces a compound having $^{29}$Si NMR chemical shifts that are significantly outside the range typically seen for hexacoordinate silicon complexes, thereby providing evidence that a hexacoordinate silicon coordination compound is not the primary reaction product at lower pH values.

Ortho-dihydroxybenzene compounds are further advantageous in the present methods because they can effectively associate with dissolved silicon in a stable manner even in the presence of chelating agents that coordinate other metal ions. As noted previously, certain metal ions can react with dissolved silicon to form highly insoluble metal-silicon species. By adding a chelating agent before or concurrently with the addition of the present non-polymeric silica scale control additives, metal ions that would otherwise lead to premature precipitation of dissolved silicon in a subterranean formation can be effectively complexed such that they do not react with dissolved silicon. For example, dissolved silicon remains soluble in the presence of ortho-dihydroxybenzene compounds even in the presence of aluminum ions when a chelating agent is utilized. In addition, certain metal ions are also capable of reacting with the ortho-dihydroxybenzene compounds themselves, thereby potentially rendering them unsuitable for associating with dissolved silicon. Hence, without being bound by theory or mechanism, inclusion of a chelating agent can both prevent unwanted precipitation of dissolved silicon as insoluble metal-silicon species and protect the ortho-dihydroxybenzene compounds from unwanted reactions with metal ions.

A further advantage of the present invention is that a large number of ortho-dihydroxybenzene compounds are cheaply available in bulk quantities. In addition, many ortho-dihydroxybenzene compounds are non-toxic, naturally occurring materials that are derived from renewable sources. Therefore, certain ortho-dihydroxybenzene compounds can be effectively utilized in environmentally sensitive areas.

In some embodiments, methods of the present invention comprise providing a treatment fluid having a pH of 6 or less that comprises an acidic base fluid and a non-polymeric silica scale control additive, and introducing the treatment fluid into at least a portion of a subterranean formation. The non-polymeric silica scale control additive retards deposition of silica scale in the subterranean formation.

In some embodiments, methods of the present invention comprise providing a treatment fluid that comprises an acidic base fluid and a non-polymeric silica scale control additive comprising a tannin, and introducing the treatment fluid into at least a portion of a subterranean formation. The non-polymeric silica scale control additive retards deposition of silica scale in the subterranean formation.

In some embodiments, methods for retarding deposition of silica scale in a subterranean formation comprise placing a treatment fluid that comprises an acidic base fluid and a non-polymeric silica scale control additive in the subterranean formation. The treatment fluid has a pH between about 0 and about 6. The non-polymeric silica scale control additive comprises tannic acid.

In some embodiments, methods of the present invention comprise providing a treatment fluid having a pH between about 0 and about 6 that comprises an acidic base fluid and a non-polymeric silica scale control additive, and introducing the treatment fluid into at least a portion of a sandstone formation. The non-polymeric silica scale control additive comprises an ortho-dihydroxybenzene compound that retards deposition of silica scale in the sandstone formation.

In some embodiments, methods of the present invention further comprise allowing the treatment fluid containing the non-polymeric silica scale control additive to reside in the subterranean formation for a period of time after being introduced thereto. In some embodiments, the non-polymeric silica scale control additive increases an amount of dissolved silicon that is present in the treatment fluids while downhole. In some embodiments, an amount of dissolved silicon in the treatment fluid is greater than about 500 ppm while in the subterranean formation. During the time that the treatment fluids of the present invention are allowed to remain downhole (e.g., during the shut-in period), the non-polymeric silica scale control additive contained therein can effectively maintain any dissolved silicon below its saturation solubility, thereby protecting the subterranean formation from damaging silica scale buildup.

In some embodiments, methods of the present invention further comprise removing the treatment fluid from the subterranean formation. Removal of the treatment fluid can be performed after the dissolved silicon in the treatment fluid has reached a desired level or after a set shut-in period has passed, for example. Once the treatment fluid has been removed from the subterranean formation, a fresh batch of treatment fluid can be introduced to the subterranean formation in order to continue the treatment operation, or another type of treatment operation can be commenced, with or without inclusion of a silica scale control additive. In some embodiments, the treatment fluids of the present invention have a concentration of dissolved silicon greater than about 500 ppm after being removed from the subterranean formation. However, depending on the pH and other factors, the treatment fluids can have considerably higher levels of dissolved silicon after removal. For example, in some embodiments, the treatment fluids can have greater than about 1000 ppm dissolved silicon after removal, or greater than about 2000 ppm dissolved silicon after removal, or even greater than about 3000 ppm dissolved silicon after removal. In some embodiments, the non-polymeric silica scale control additives of the present invention can be added to a different type of treatment fluid for further subterranean operations after an initial well treatment operation has been performed, such as that described above.

In various embodiments, the non-polymeric silica scale control additives of the present invention comprise ortho-dihydroxybenzene compounds and derivatives thereof. In general, the ortho-dihydroxybenzene compounds have the following structure (1), where the benzene ring can be unfused or fused as part of a polycyclic ring system containing other aromatic and/or non-aromatic rings. Further, the ortho-dihydroxybenzene compounds can contain any type and number of additional functionality ($Q_1$) at any of the aromatic carbons not occupied by the ortho-phenolic groups.

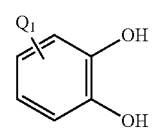

(1)

In some embodiments, the ortho-dihydroxybenzene compounds contain a single ortho-dihydroxybenzene unit. Illustrative examples of such ortho-dihydroxybenzene compounds include, but are not limited to, catechol, pyrogallol, 1,2,4-benzenetriol, 2,4,5-trihydroxybenzoic acid, 3,4,5-trihydroxybenzoic acid (gallic acid), 2,3,4-trihydroxybenzoic acid, 2,3-dihydroxybenzoic acid, 3,4-dihydroxybenzoic acid, 6,7-dihydroxycoumarin, ellagic acid, urushiols, chlorogenic acid, caffeic acid, and like compounds. Other examples can be envisioned by those having ordinary skill in the art. In other embodiments, the ortho-dihydroxybenzene compounds contain multiple ortho-dihydroxybenzene units (i.e., 2 or more) as part of a larger compound (e.g., tannic acid and other hydrolysable tannins, including gallotannins and ellagitannins). Ortho-dihydroxybenzene compounds suitable for practicing the present invention can further be selected from naturally occurring compounds or synthetic analogs thereof containing at least one ortho-dihydroxybenzene unit. Illustrative classes of such compounds that contain at least one ortho-dihydroxybenzene unit include, for example, flavanoids, flavanols, flavonols, flavonodids, catechins, anthocyanidins, and isoflavanoids. Structures of these compounds will be known to those having ordinary skill in the art.

Generally, water-solubility of the ortho-dihydroxybenzene compound can be beneficial for inclusion in a treatment fluid comprising an aqueous base fluid. Although the ortho-dihydroxybenzene compound can be water soluble in some embodiments, water solubility is by no means a required property. In addition, one of ordinary skill in the art will recognize that ortho-dihydroxybenzene compounds having more than one ortho-dihydroxybenzene unit can be more water-soluble than an ortho-dihydroxybenzene compound having only a single ortho-dihydroxybenzene unit due to a greater opportunity for hydrogen bonding interactions with water to take place. In various embodiments, a water-soluble ortho-dihydroxybenzene compound has a molecular weight of less than about 3000.

In various embodiments, the non-polymeric silica scale control additive of the present invention comprises a tannin. Moreover, in some embodiments, the tannin comprises tannic acid. Tannic acid is a naturally occurring ester of glucose and gallic acid. Although tannic acid is often sold commercially as a product having the formula $C_{76}H_{52}O_{46}$ (MW=1700), one of ordinary skill in the art will recognize that tannic acid represents a plurality of such ester products having a molecular weight of less than about 3000 and, more particularly, a molecular weight between about 500 and about 3000. An illustrative structure (2) of tannic acid follows below but should not be considered as limiting of the scope of the embodiments described herein.

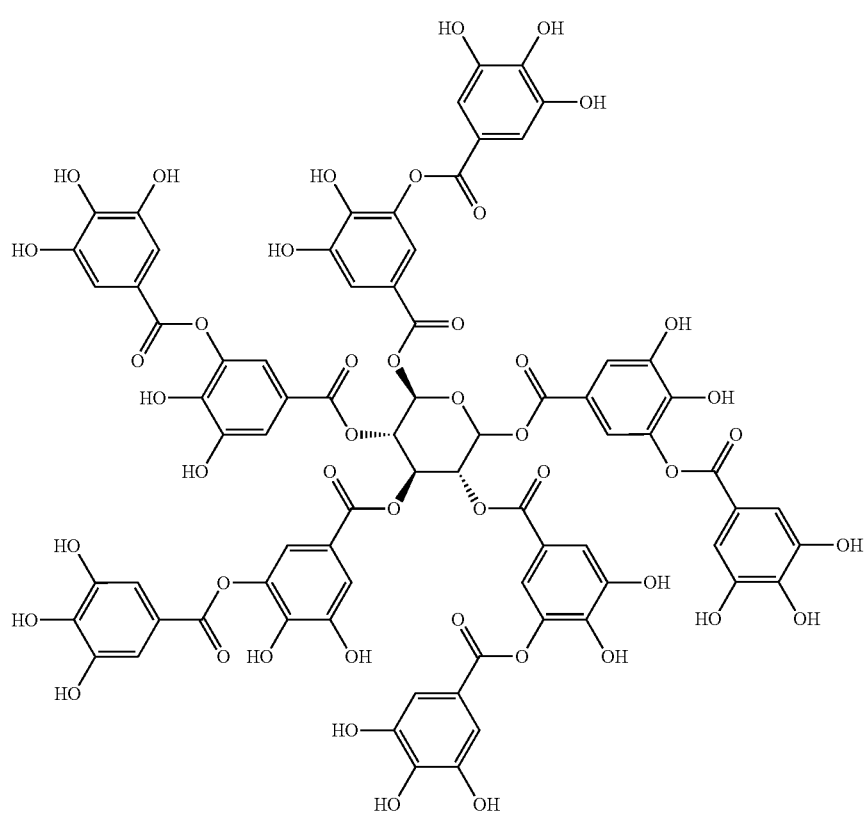

(2)

As used herein, the term "tannic acid" refers to any compound comprising a central glucose core and any number of gallic acid units esterified thereto, such that the compound's molecular weight is less than about 3000. One of ordinary skill in the art will recognize that a variety of natural and synthetic compounds having a structure related to that of tannic acid are known in the art and can be used for practicing the embodiments described herein. With the benefit of the present disclosure, one of ordinary skill in the art can substitute any of these structurally related compounds for tannic acid in any of the present embodiments while still operating within the spirit and scope of the present invention. For example, in some embodiments, any other naturally occurring sugar or non-naturally occurring sugar can be substituted for the central glucose core. In other embodiments, compounds other than gallic acid that contain an ortho-dihydroxybenzene moiety can be esterified to a central core of glucose or another sugar. In still other embodiments, a variable number of gallic acid units can be esterified to the glucose central core.

It will be understood by those of ordinary skill in the art that tannic acid is particularly advantageous for practicing the embodiments of the present invention due to its high water solubility (2.85 g/mL), which allows high concentration treatment fluids to be formulated using an acidic base fluid. Additionally, tannic acid's high concentration of ortho-dihydroxybenzene units per unit weight, conveys a high capacity to this compound for associating or complexing dissolved silicon species in the present treatment fluids and methods. From an economic standpoint, tannic acid also possesses the further advantage of being readily isolable from natural sources in bulk quantities at a low cost that is not prohibitive toward large scale use.

As noted above, treatment fluids of the present invention can be utilized in a pH range that is considerably higher than that of conventional treatment fluids used for suppressing silica scale deposition. Further, the pH of the treatment fluid, among other factors, can have an impact on the ultimate saturation solubility of dissolved silicon that can be maintained in the treatment fluid by the non-polymeric silica scale control additive. In some embodiments, the treatment fluids of the present invention have a pH between about 0 and about 6. In some embodiments, the treatment fluids of the present invention have pH between about 0 and 5.5. In some embodiments, the treatment fluids of the present invention have pH between about 0 and 5. In some embodiments, the treatment fluids of the present invention have pH between about 0 and 4.5. In some embodiments, the treatment fluids of the present invention have pH between about 0 and 4. In some embodiments, the treatment fluids of the present invention have pH between about 0 and 3.5. In some embodiments, the treatment fluids of the present invention have pH between about 0 and 3. In some embodiments, the treatment fluids of the present invention have pH between about 0 and 2.5. In some embodiments, the treatment fluids of the present invention have pH between about 0 and 2. In some embodiments, the treatment fluids of the present invention have a pH of 3 or less.

In some embodiments, the subterranean formation into which the treatment fluids of the present invention are introduced is an acid-sensitive formation. Illustrative acid-sensitive formations include, for example, high temperature formations, high pressure formations, and sandstone formations, including hydrothermal sandstone formations. In some embodiments, the treatment fluids of the present invention are introduced into a sandstone formation.

The treatment fluids of the present invention comprise an acidic base fluid. In some embodiments, the acidic base fluid is an aqueous-based fluid. Aqueous-based fluids that are suitable for practicing the present invention include, for example, fresh water, saltwater (e.g., water containing one or more salts dissolved therein), brine, seawater, or combinations thereof. Generally, the water can be from any source, provided that it does not contain significant quantities of materials that might adversely affect the stability and/or performance of the treatment fluids. In particular, the aqueous-based fluids ideally should not contain significant quantities of metal ions that are reactive with ortho-dihydxoxybenzene compounds or form an insoluble compound upon reaction with dissolved silicon, unless a chelating agent is included to sequester at least a portion of the interfering metal ions. Additional benefits of including a chelating agent are discussed hereinafter. Alternately, the quantity of metal ions in the treatment fluid can be below a threshold value such that only insignificant quantities of precipitated silica particles are deposited.

The treatment fluids of the present invention can be made acidic using at least one acid. Examples of suitable acids include, without limitation, hydrochloric acid, hydrofluoric acid, acetic acid, formic acid, citric acid, lactic acid, glycolic acid, sulfamic acid, tartaric acid, methanesulfonic acid, trichloroacetic acid, dichloroacetic acid, chloroacetic acid, fluoroboric acid, fluorophosphoric acid, hexafluorotitanic acid, fluorophosphoric acid and phosphoric acid. Suitable acid-generating compounds can also be used in an embodiment. Examples of acid generating compounds include, for example, esters, aliphatic polyesters, orthoesters, poly(ortho esters), poly(lactides), poly(glycolides), poly(s-caprolactones), poly(hydroxybutyrates), poly(anhydrides), and any copolymers thereof. Other suitable acid-generating compounds include, for example, ethylene glycol monoformate, ethylene glycol diformate, diethylene glycol diformate, glyceryl monoformate, glyceryl diformate, glyceryl triformate, triethylene glycol diformate and formate esters of pentaerythritol. It should be noted that some of the above acids and acid-generating compounds are reported to complex dissolved silicon at high pH values. However, complexation of dissolved silicon with these species should be negligible at acidic pH values in the present treatment fluids. In general, the acid or acid-generating compound is present in the treatment fluid in an amount such that the treatment fluid contains between about 1% and about 50% acid by volume. In some embodiments, the treatment fluid contains between about 1% and about 37% acid by volume.

In some embodiments, the treatment fluids of the present invention can comprise an emulsion, a gel, a foamed fluid (e.g., a liquid that contains a gas), or any combination thereof. As used herein, the term "gel" refers to a viscoelastic or semi-solid, jelly-like state assumed by some colloidal dispersions. As used herein, the term "foamed" also refers to fluids such as co-mingled fluids. Use of foamed treatment fluids may be desirable to reduce the amount of treatment fluids being introduced into a subterranean formation. Use of foamed treatment fluids can be advantageous in, for example, water-sensitive formations and formations that are susceptible to fluid loss. Foamed fluids can also provide enhanced proppant suspension, if desired, in a stimulation operation.

The non-polymeric silica scale control additives of the present invention can be used over a wide concentration range in treatment fluids. One of ordinary skill in the art will recognize that higher concentrations of dissolved silicon in a subterranean formation can dictate that either higher concentrations of the non-polymeric silica scale control additive or greater amounts of treatment fluid are used in a treatment operation in order to effectively control silica scale deposition. In general, the non-polymeric silica scale control additive can be present in the treatment fluid up to the solubility limit. Further, a near-stoichiometric relationship between the non-polymeric silica scale control additive and the dissolved silicon can provide better retardation of silica scale deposition. In some embodiments, the non-polymeric silica scale control additive is present in the acidic base fluid at concentration ranging between about 0.01% and about 50% by weight. In other embodiments, the non-polymeric silica scale control additive is present in the acidic base fluid at a concentration ranging between about 1% and about 50% by weight. In still other embodiments, the non-polymeric silica scale control additive is present in the acidic base fluid at a concentration ranging between about 5% and about 50% by weight or between about 10% and about 50% by weight. In addition to the foregoing, one of ordinary skill in the art will also recognize that the ionic strength of the treatment fluid can also influence the ultimate solubility limit of both the non-polymeric silica scale control additive and the dissolved silicon.

In some embodiments, the treatment fluids of the present invention further comprise a chelating agent. Again without being bound by theory or mechanism, Applicant believes that including chelating agents in the treatment fluids of the present invention allows reactive metal ions that would otherwise react with ortho-dihydroxybenzene compounds or form insoluble metal-silicon compounds to be effectively sequestered in a chelate complex and rendered inactive. As an additional benefit, some chelating agents can also effectively buffer the acidic base fluid, thereby slowing pH changes experienced therein. Illustrative chelating agents include, for example, α-hydroxycarboxylic acids (e.g., citric acid, tartaric acid, malic acid, lactic acid, and glycolic acid), phosphonates, nitriloacetic acid, diethylenetriaminepentaacetic acid (DTPA), ethylenediaminetetraacetic acid (EDTA) and like compounds [e.g., cyclohexylenediaminetetraacetic acid (Cy-DTA)], hydroxyaminocarboxylic acids and hydroxyaminopolycarboxylic acids [e.g., hydroxyethylethylenediaminetriacetic acid (HEDTA), and hydroxyethyliminodiacetic acid (HEIDA)], diammonium ethylenediaminetetraacetic acid (DAE) and ethylenediamine-N,N'-disuccinic acid (EDDS). Further disclosure regarding the use of chelating agents in treatment fluids can be found in U.S. Pat. Nos. 6,531,427 and 7,192,908, each of which is incorporated herein by reference in its entirety.

The specific concentration of each chelating agent used in the present treatment fluids varies for each type of substance. The concentration range is generally chosen such that the chelating agent is present in sufficient quantities to complex unwanted metal ions. Solubility limits of the chelating agent can also dictate the working concentration range. For example, the solubility of the ammonium salt of HEDTA is higher than that of the sodium salt. By way of non-limiting example, the following concentrations of chelating agents can be used in various embodiments: about 5% to about 45% w/v HEDTA, about 1% to about 10% w/v HEIDA, about 1% to about 25% w/v DAE, about 1% to about 15% w/v citric acid, about 1% to about 100% w/v "DISSOVINE" (N,N-diacetic acid glutamic acid mono- or tetra-sodium salt that is infinitely soluble in aqueous fluids and commercially available from Akzo Nobel), about 1% to 10% w/v glycolic acid, about 1 to about 20% w/v tartaric acid, about 1% to 20% w/v lactic acid and about 0.5% to about 5% alkylphosphonic acid.

In embodiments of the present invention in which the treatment fluid further comprises a chelating agent, the methods can further comprise complexing at least a portion of any metal ions present in the subterranean formation with the chelating agent. In some embodiments, substantially all of the metal ions in the subterranean formation can be complexed with the chelating agent. In other embodiments, only a substantial portion of the metal ions in the subterranean formation that are reactive with ortho-dihydroxybenzene compounds are complexed. In an embodiment, the chelating agent complexes aluminum ions in the subterranean formation. In some or other embodiments, metal ions such as, for example, calcium, magnesium, iron (II) and iron (III) can also be complexed by the chelating agents. All of the aforementioned metal ions are normally present to some degree in sandstone formations. Iron (II) and iron (III) ions, in particular, are known to be particularly reactive with ortho-dihydroxybenzene compounds.

In some embodiments, the non-polymeric silica scale control additives can be combined with a polymeric silica scale control additive. Suitable polymeric silica scale control additives include, for example, polyaminoamide dendrimers and polyethyleneimine, which may be combined with carboxymethylinulin and polyacrylates. Other suitable polymeric silica scale control additives include, for example, polyallylamines, copolymers of polyacrylamides, and polyallyldiamethylammonium chloride. A number of polymeric silica scale control additives are commercially available including, for example, "ACUMER 5000," from Rohm and Hass of Philadelphia, Pa., and "CLA-STA XP" and "CLA-STA FS" available from Halliburton Energy Services, Inc. of Duncan, Okla.

In certain embodiments, the treatment fluids of the present invention can also comprise any additional additive that is suitable for a particular subterranean operation. Additional additives include, without limitation, acids, pH control additives, hydrate inhibitors, clay stabilizers, salt substitutes (e.g., tetramethyl ammonium chloride), relative permeability modifiers (e.g., HPT-1™ chemical additive available from Halliburton Energy Services, Inc. of Duncan, Okla.), sulfide scavengers, fibers, nanoparticles, consolidating agents (e.g., resins and/or tackifiers), corrosion inhibitors, corrosion inhibitor intensifiers, surfactants, breakers, fluid loss control additives, salts, bactericides, crosslinking agents, stabilizers, foamers, defoamers, emulsifiers, demulsifiers, iron control agents, solvents, mutual solvents, particulate diverters, gas phase agents, carbon dioxide, nitrogen, biopolymers, synthetic polymers, friction reducers and the like. Combinations of these additional additives can also be used in a given application. One of ordinary skill in the art will recognize the benefits of a particular additive in a given subterranean operation, having the benefit of this disclosure.

In some embodiments, the treatment fluids of the present invention further comprise at least one surfactant. Without being bound by theory or mechanism, it is believed that surfactants improve the compatibility of the treatment fluids with other fluids that may be present in a subterranean formation. For example, surfactants can reduce the likelihood of forming downhole emulsions. Surfactants can also improve the solubility of the non-polymeric silica scale control additives in the treatment fluids of the present invention. Surfactants that can be used in the present treatment fluids include, for example, nonionic surfactants, cationic surfactants, anionic surfactants or amphoteric/zwitterionic surfactants. Illustrative examples of surfactants include, without limitation, ethoxylated nonyl phenol phosphate esters, alkyl phosphonates, linear alcohols, nonylphenol compounds, alkyoxylated fatty acids, alkylphenol alkoxylates, ethoxylated amides, ethoxylated alkyl amines, betaines, methyl ester sulfonates (e.g., as described in U.S. Patent Application Publication Nos. 2006/0180310, 2006/0180309 and 2006/0183646 and U.S. Pat. No. 7,159,659, the entire disclosures of which are all incorporated herein by reference), hydrolyzed keratin (e.g., as described in U.S. Pat. No. 6,547,871, the entire disclosure of which is incorporated herein by reference), sulfosuccinates, taurates, amine oxides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine) and quaternary ammonium compounds (e.g., trimethyltallowammonium chloride, trimethylcocoammonium chloride). Suitable surfactants can be used in a liquid or powder form. Where used, the surfactants are generally present in the treatment fluid in an amount ranging between about 0.01% and about 5.0% by volume of the treatment fluid. In some embodiments, a liquid surfactant is present in the treatment fluid in an amount ranging between about 0.01% and about 2.0% by volume of the treatment fluid. In some embodiments, a powdered surfactant is present in the treatment fluid in an amount ranging between about 0.001% to about 0.5% by weight of the treatment fluid.

While typically not required, the treatment fluids of the present invention also can comprise compatible breakers that are capable of reducing the viscosity of the treatment fluid at a desired time. Examples of such suitable breakers include, for example, sodium chlorite, hypochlorites, perborates, peroxides (e.g., hydrogen peroxides and organic peroxides such as, for example, tert-butyl hydroperoxide and tert-amyl hydroperoxide), enzymes, and acids. A breaker can be included in the treatment fluids of the present invention in an amount and form sufficient to achieve a desired amount of viscosity reduction at a desired time.

The breaker can be formulated to provide a delayed break, if desired, without interference with or degradation of the non-polymeric silica scale control additive. For example, a suitable breaker can be encapsulated, if desired, to achieve a delayed break. Suitable encapsulation methods are known to those of ordinary skill in the art. One suitable encapsulation method that may be used involves coating the breaker with a material that degrades when placed downhole so as to release the breaker at an appropriate time. The term "coating" as used herein refers to at least a partial coating of some particulates of the breaker. Coating materials that can be suitable include, for example, polymeric materials that degrade when downhole. The terms "degrade," "degradation," or "degradable" refer to two relatively extreme cases of hydrolytic degradation that a degradable material can undergo: heterogeneous degradation (or bulk erosion), homogeneous degradation (or surface erosion), and any state of degradation in between. Degradation can be a result of, among other things, a chemical reaction, a thermal reaction, and/or a reaction induced by radiation exposure. Suitable examples of degradable materials include, for example, polysaccharides (e.g., dextran and cellulose), chitins, chitosans, proteins, aliphatic polyesters, poly(lactides), poly(glycolides), poly(ε-caprolactones), poly (hydroxybutyrates), poly(anhydrides), aliphatic polycarbonates, orthoesters, poly(orthoesters), poly(amino acids), poly (ethylene oxides) and polyphosphazenes.

The treatment fluids of the present invention also can further comprise suitable fluid loss control agents. Fluid loss control agents can be useful, among other instances, when treatment fluids of the present invention are being used in a stimulation application. Suitable fluid loss agents include, for example, starches and diesel dispersed in a fluid. Other examples of suitable fluid loss control additives that may be suitable are those that comprise a degradable material or a degradable polymer [e.g., polysaccharides such as dextran or cellulose, chitins, chitosans, proteins, aliphatic polyesters, poly(lactides), poly(glycolides), poly(glycolide-co-lactides), poly(ε-caprolactones), poly(3-hydroxybutyrates), poly(3-hydroxybutyrate-co-hydroxyvalerates), poly(anhydrides), aliphatic poly(carbonates), poly(orthoesters), poly(amino acids), poly(ethylene oxides), and poly(phosphazenes)]. When used, fluid loss control additives can be included in the present treatment fluids in an amount ranging from about 0.01% to about 20% by volume of the treatment fluid, or, in some embodiments, from about 1% to about 10% by volume of the treatment fluid.

Salts can optionally be included in the treatment fluids of the present invention. Although salts can be added for many purposes, a common reason for adding a salt can be to adjust the density of the treatment fluid. Suitable salts for adjusting density include, for example, sodium chloride, sodium bromide, potassium bromide, potassium chloride, sodium nitrate, sodium formate, potassium formate, ammonium bromide, ammonium chloride and the like. If the salts contain a metal cation that interferes with the binding of the non-polymeric silica scale control additives with dissolved silicon and/or is reactive with dissolved silicon, a chelating agent can be included to sequester at least a portion of the interfering metal ions.

To facilitate a better understanding of the present invention, the following examples of preferred embodiments are given. In no way should the following examples be read to limit, or to define, the scope of the invention.

EXPERIMENTAL EXAMPLES

Example 1

Inhibition of Silica Precipitation in the Presence of Tannic Acid

A stock solution of silicic acid was prepared by dissolving 10.56 g of $Na_2SiO_3.9H_2O$ in 10.3 L distilled water and adjusting the pH to 0.6 with 37% v/v HCl. The measured concentration was 424 ppm after filtering through a 0.45 μm membrane filter. This stock solution was used in all of the experimental examples below.

A working solution of silicic acid was prepared by dissolving 40.00 g $Na_2SiO_3.9H_2O$ in 1.0 L of the silicic acid stock solution and adjusting the pH to 0.4 with 37% HCl. The working solution was then filtered through a 0.25 μm borosilicate glass fit immediately after preparation and also just before use. Volumes of the filtered working solution were then volumetrically aliquoted to provide a test solution having the concentrations (mg/L) listed in Table 1 after addition of all test solution components. A 0.0176 M tannic acid solution in water was also prepared. Volumes of the tannic acid solution were volumetrically aliquoted to the test solution to yield the final concentrations listed in Table 1. The initial pH of the solution was noted, and the pH was thereafter raised by addition of aliquots of a concentrated aqueous base solution (KOH or $NH_4OH$). The pH at which precipitation occurred was then noted, as evaluated by the naked eye. Samples 5 and 7 contained additional $Na_2SiO_3.9H_2O$ added directly to the testing solution after preparation while still at a pH of less than 1. The additional $Na_2SiO_3.9H_2O$ added to samples 5 and 7 are not included in the concentrations noted in Table 1. For these samples, the extra silicate was to test whether a sudden increase in silicate concentration would shift the equilibrium of the tannic acid-silica reaction product. However, as evidenced by lack of a precipitate, addition of excess silicate failed to shift the chemical equilibrium.

TABLE 1

| Sample Number | Conc. of Tannic Acid (mg/L) | Conc. of Silicic Acid (mg/L) | Ratio of Tannic Acid to Silicic Acid | Initial pH | Total Volume (mL) | Precipitation pH |
|---|---|---|---|---|---|---|
| 1 | 1116 | 829 | 2.90:1 | 0.74 | 172 | >5.0 |
| 2 | 638 | 1116 | 1.52:1 | 0.54 | 150 | >5.0 |
| 3 | 77 | 1941 | 0.25:1 | 0.10 | 100 | >1.0 |
| 4 | 320 | 2139 | 0.56:1 | 0.40 | 150 | >1.0 |
| 5 | 1429 | 1886[1] | 1.59:1 | 0.74 | 210 | >3.4 |
| 6 | 3610 | 1597 | 3.57:1 | 0.58 | 300 | 2.8 |
| 7 | 1395 | 2436[2] | 1.23:1 | 0.37 | 215 | 3.4 |

[1]Contains additional 4.33 g $Na_2SiO_3•9H_2O$.
[2]Contains additional 0.47 g $Na_2SiO_3•9H_2O$.

As shown in Table 1, increased tannic acid to silicic acid ratios led to an increased pH at which precipitation occurred. It is believed that saturation effects may account for the lower precipitation pH in samples 5-7 due to their much higher quantities of tannic acid. Specifically, in these samples, precipitation occurred at a pH of around 3, whereas in sample 2, which had a smaller quantity of both tannic acid and silicic acid, precipitation occurred at a pH of greater than 5. This is in spite of sample 2's comparable ratio of tannic acid to silicic acid relative to samples 5-7.

Example 2

Inhibition of Silica Precipitation in the Presence of Tannic Acid and a Chelating Agent To 125 mL of the silicic acid stock solution was added a solution of glycolic acid and tannic acid to produce a solution that was 0.02 M in tannic acid and 0.01 M in diglycolic acid after dilution. Solid $Na_2SiO_3.9H_2O$ was added directly to the combined solution, and the mixture was magnetically stirred while monitoring the pH with a Mettler Toledo pH probe. Once the pH had stabilized, the pH was increased slowly by the addition of a concentrated base solution (KOH or $NH_4OH$) in order to minimize dilution. The addition of 2 mL aliquots of base until a total of 8 mL had been added brought the pH to approximately 2. Additional base rapidly changed the pH as the endpoint was neared and a pH greater than about 6 was reached. At each pH the dissolved silicon concentration was measured by inductively coupled plasma (ICP). FIG. 1 shows an illustrative bar graph of measured silicon concentration as a function of pH in the presence of tannic acid. As shown in FIG. 1, the dissolved silicon was effectively maintained in solution by the tannic acid up to a pH of 2. At higher pH values, the concentration of soluble silica dropped considerably due to rapid precipitation. Addition of acid to the precipitated solid resulted in redissolution of about 50% of the silicon at a pH of 1.5 (see FIG. 1).

Example 3

Inhibition of Silica Precipitation in the Presence of Tannic Acid and $Al^{3+}$

A solution of $Al^{3+}$ was prepared by dissolving aluminum acetate in 100 mL of distilled water to form a 0.080 M solution having a pH of 4.96. To this solution were added incremental volumes of a 0.017 M tannic acid solution having a pH of 2.25. The pH was monitored while adding the tannic acid solution until a pH of 2.4 was reached. Approximately 65 mL of the tannic acid solution was added. To the $Al^{3+}$/tannic acid solution was added 50 mL of the silicic acid stock solution, which further reduced the pH to 0.8. The pH was gradually raised with a strong base as described in Examples 1 and 2. Shortly after reaching a pH of 1, a colloid formed that slowly redissolved with stirring. Further addition of base was continued until a pH of 3 was reached, at which point redissolution of the colloidal solid failed to occur. Unlike Example 2, the addition of acid failed to redissolve the precipitate. Thus, this example shows that lower saturation concentrations of dissolved silicon occur in the presence of aluminum ions.

Example 4

Inhibition of Silica Precipitation in the Presence of Tannic Acid, $Al^{3+}$ and a Chelating Agent A solution of $Al^{3+}$ was prepared by dissolving 1.19 g aluminum acetate in 110 mL of 20% (w/v) HEDTA solution, which also contained 5-10% glycolic acid. This solution had a pH of approximately 4. To this solution was added 50 mL of a 0.017 M tannic acid solution, 100 mL of the silicic acid stock solution, and finally water to produce a final volume of 300 mL. The pH of the combined solution was approximately 2. No precipitation was noted. The solution was split into two equal parts and a strong base solution was added to each to provide final pH values of 3.55 and 4.0. Unlike Example 3, neither of these solutions formed a precipitate within 4 hours of monitoring. Thus, this example shows that addition of a chelating agent can effectively sequester aluminum and maintain higher solution concentrations of dissolved silicon over a broad pH range.

Example 5

$^{29}$Si NMR Characterization of the Association Between Silicic Acid and Tannic Acid at Low pH A $^{29}$Si NMR spectrum was obtained for a solution that was 0.084 M in $Na_2SiO_3$ and 0.0135 M in tannic acid at a solution pH of 2.8. Two $^{29}$Si NMR resonances were observed: −74 ppm and −79 ppm.

Typical $^{29}$Si NMR chemical shift resonances for various silicon coordination complexes are summarized in Table 2. Typical $^{29}$Si NMR chemical shift resonances for soluble silicon in the form of monomers, dimers and linear or cyclic trimers and tetramers of silicic acid ($H_4SiO_4$) range from −71 to −89.4 ppm. (for example, see Cho, et al., "Solution State Structure Determination of Silicate Oligomers by $^{29}$Si NMR Spectroscopy and Molecular Modeling," *J. Am. Chem. Soc.*, 128:2006, pp. 2324-2335; Lambert, et al., "Silicate Complexes of Sugars in Aqueous Solution," *J. Am. Chem. Soc.*, 126:2004, pp. 9611-9625; Sahai, et al, "$^{29}$Si NMR Shifts and Relative Stabilities Calculated for Hypercoordinated Silicon-Polyalcohol Complexes: Role in Sol-Gel and Biogenic Silica Synthesis," *Inorg. Chem.*, 41:2002, pp. 748-756; and Sanchez, et al., "$^{29}$Si NMR Kinetic Study of Tetraethoxysiland and Ethyl-Substituted Ethoxysilane Polymerization in Acidic Conditions," *Ind. Eng. Chem. Res.*, 35:1996, pp. 117-129.

TABLE 2

| Silicon Coordination | Ligand | $^{29}$Si NMR Chemical Shift (ppm) |
| --- | --- | --- |
| Tetracoordinate | a | −57 to −79 |
| Pentacoordinate | b | −117/−118 and −128 to −140 |
| Hexacoordinate | c, d | −180$^c$ −140 to −144$^d$ |

$^a$ligand = ethylene glycol
$^b$ligand = glycerol
$^c$ligand = threitol or arabinol
$^d$ligand = catechol, 4-methylcatechol, pyrogallol, L-DOPA, 3,3',4,4'-tetrahydroxybiphenyl Comparing the observed $^{29}$Si NMR chemical shifts to those shown in Table 2, it is apparent that the observed chemical shifts are outside the range typically observed for pentacoordinate and hexacoordinate silicon complexes. Hexacoordinate silicon is more typically observed with catechol-based ligands (see Table 2). The observed $^{29}$Si NMR chemical shifts are more typical of soluble silicon, which indicates an associative interaction between silicon and tannic acid.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is the following:

1. A method comprising:
   providing a treatment fluid having a pH between about 0 and 3 that comprises an acidic base fluid and a non-polymeric silica scale control additive, the non-polymeric silica scale control additive comprising an ortho-dihydroxybenzene compound or a derivative thereof;
   introducing the treatment fluid into at least a portion of a subterranean formation; and
   associating silicon in a non-complexed form in the subterranean formation with the non-polymeric silica scale control additive;
   wherein the non-polymeric silica scale control additive retards deposition of silica scale in the subterranean formation as the pH rises.

2. The method of claim 1, further comprising:
   after introducing the treatment fluid, allowing the treatment fluid to reside in the subterranean formation for a period of time; and
   removing the treatment fluid from the subterranean formation.

3. The method of claim 2, wherein an amount of dissolved silicon in the treatment fluid is greater than about 500 ppm while in the subterranean formation.

4. The method of claim 1, wherein the ortho-dihydroxybenzene compound is water soluble.

5. The method of claim 4, wherein the ortho-dihydroxybenzene compound has a molecular weight of less than about 3000.

6. The method of claim 1, wherein the ortho-dihydroxybenzene compound comprises at least one compound selected from the group consisting of a flavanoid, a flavanol, a flavonol, a flavonodid, a catechin, a tannin, an anthocyanidin, an isoflavanoid, derivatives thereof, and combinations thereof.

7. The method of claim 6, wherein the tannin comprises tannic acid.

8. The method of claim 1, wherein the subterranean formation is a sandstone formation.

9. The method of claim 1, wherein the treatment fluid further comprises a chelating agent.

10. The method of claim 9, further comprising:
    complexing at least a portion of any metal ions present in the subterranean formation with the chelating agent.

11. A method comprising:
    providing a treatment fluid having a pH between about 0 and 3 that comprises an acidic base fluid and a non-polymeric silica scale control additive;
       wherein the non-polymeric silica scale control additive comprises a tannin;
    introducing the treatment fluid into at least a portion of a subterranean formation; and
    associating silicon in a non-complexed form in the subterranean formation with the non-polymeric silica scale control additive;
       wherein the non-polymeric silica scale control additive retards deposition of silica scale in the subterranean formation as the pH rises.

12. The method of claim 11, wherein the tannin has a molecular weight of less than about 3000.

13. The method of claim 12, wherein the tannin comprises tannic acid.

14. The method of claim 11, further comprising:
    after introducing the treatment fluid, allowing the treatment fluid to reside in the subterranean formation for a period of time; and
    removing the treatment fluid from the subterranean formation.

15. The method of claim 14, wherein an amount of dissolved silicon in the treatment fluid is greater than about 500 ppm while in the subterranean formation.

16. The method of claim 11, wherein the treatment fluid further comprises a chelating agent.

17. The method of claim 16, further comprising:
    complexing at least a portion of any metal ions present in the subterranean formation with the chelating agent.

18. The method of claim 11, wherein the subterranean formation is a sandstone formation.

19. A method for retarding deposition of silica scale in a subterranean formation, the method comprising:
    placing a treatment fluid that comprises an acidic base fluid and a non-polymeric silica scale control additive in the subterranean formation;
       wherein the treatment fluid has a pH between about 0 and 3; and
       wherein the non-polymeric silica scale control additive comprises tannic acid;
    associating silicon in a non-complexed form in the subterranean formation with the non-polymeric silica scale control additive; and
    raising the pH of the treatment fluid to between about 3 and about 5 while maintaining the silicon in a dissolved form.

20. A method comprising:
    providing a treatment fluid having a pH between about 0 and 3 that comprises an acidic base fluid and a non-polymeric silica scale control additive;
       wherein the non-polymeric silica scale control additive comprises an ortho-dihydroxybenzene compound;
    introducing the treatment fluid into at least a portion of a sandstone formation; and
    associating silicon in a non-complexed form in the sandstone formation with the non-polymeric silica scale control additive;
       wherein the non-polymeric silica scale control additive retards deposition of silica scale in the sandstone formation as the pH rises.

* * * * *